United States Patent Office 3,055,880
Patented Sept. 25, 1962

3,055,880
POLYMERIZATION OF OLEFINS WITH AN ALUMINUM CARBIDE-TITANIUM TETRAHALIDE CATALYST
Bernhard Raecke, Dusseldorf, Germany, assignor to Henkel & Cie. G.m.b.H., Dusseldorf-Holthausen, Germany, a corporation of Germany
No Drawing. Filed Sept. 28, 1959, Ser. No. 842,555
5 Claims. (Cl. 260—94.9)

This invention relates to the polymerization of olefins, and more particularly to the polymerization of aliphatic olefins in the presence of titanium halides and aluminum carbide.

This application is a continuation-in-part of my copending United States patent application, Serial Number 684,633, filed September 18, 1957, now Patent No. 3,007,909.

It is known that olefins, such as ethylene, propylene and the like, may be polymerized into high-molecular thermoplastic substances in the presence of polymerization catalysts, such as aluminum chloride, metal oxides, for example chromium oxide or molybdenum oxide, peroxides or aluminum alkyls. These known processes have been carried out at elevated pressures, particularly in the range between extremely high pressures and atmospheric pressure.

I have found that polymerizable aliphatic olefins can be transformed into high-molecular thermosplastic polymers by heating them to elevated temperatures in the presence of a catalyst mixture comprising (1) titanium tetrahalides and (2) aluminum carbide.

Polymerizable olefins which may be used for the process according to the invention include, for example, ethylene, propylene, 1-butene, 1-pentene, 1-hexene, isobutylene, 3-methyl-butene, 4-methyl-pentene-1, 4-methyl-hexene-1, 5-methyl-hexene-1, and the like. It is not necessary to employ particularly pure olefins. Mixtures of olefins with other hydrocarbons as well as mixtures of various olefins may be used; under these circumstances, copolymerization takes place to a varying degree. A certain minimum concentration of olefin is necessary for the polymerization. Consequently, if gaseous, low-boiling-point, lower aliphatic olefins are used, the reaction is carried out under pressure in an autoclave in the presence of inert solvents. The pressure of the olefins, for example ethylene, does not need to be very high. Initial pressures of about 20 atmospheres gauge are sufficient. It is, however, also possible to work under much higher pressures; the upper limits of pressure are merely determined by the available apparatus, such as pumps, autoclaves and the like.

Hydrocarbons, such as low-boiling-point petroleum fractions of all kinds, paraffin oil, molten paraffin waxes, benzene, and the like, have been found to be useful as inert solvents. Their use offers the further advantage that they absorb some of the substantial heat of polymerization.

The optimum polymerization temperature varies; in some cases it was observed that the polymerization sets in at temperatures slightly above 100° C. However, the starting mixture may also be heated to temperatures of 150–170° C. and still higher, whereby the polymerization reaction is released with certainty and may be brought to completion.

The polymerization goes to completion after a short period of time. In general, the reaction mixture is held at the reaction temperature as long as polymerization is taking place, which can readily be determined by a decrease of the pressure. The reaction may, however, also be interrupted prior to completion, and the unreacted olefin may be recovered from the reaction mixture.

The ratio between aluminum carbide and titanium tetrahalide may vary over wide limits. A ratio of one part by weight of aluminum carbide to 0.5 to 3 parts by weight of titanium tetrahalide, particularly titanium tetrachloride, is preferred. Other halides such as titanium tetrabromide can be used. A particularly advantageous procedure comprises suspending the catalyst in about 15–30 times its volume of inert solvent, and maintaining the mixture in motion by means of stirring devices or by shaking or rotating the reaction vessel.

The aluminum carbide is advantageously used in the form of a powder.

I have found that the use of a catalyst mixture comprising (1) titanium tetrahalide and (2) aluminum carbide is unexpectedly superior to a similar prior art catalyst mixture of (1) titanium tetrahalide and (2) aluminum (in the metallic form) in the production of solid polymers from aliphatic olefins. By the use of the catalyst combination of the invention, solid polyethylene is produced in yields of two to four times the yields obtained by the prior art catalyst mixture of titanium tetrachloride and aluminum powder under comparable conditions.

I have further discovered, as is described and claimed in my copending application S.N. 684,633, now Patent No. 3,007,907, of which this application is a continuation-in-part, that the effect of the catalyst mixture of titanium tetrahalide and aluminum carbide or of the inferior catalyst mixture of titanium tetrahalide and aluminum can be made still more pronounced by the addition of small amounts of a polar substance to the reaction mixture. The addition of the polar substance has the effect that the polymerization reaction is rapidly released at lower temperatures. Such polar substances are, for example, water, salt solutions, acids, such as hydrofluoric acid, hydrochloric acid, phosphoric acid or acetic acid, alcohols, ketones, such as acetone, carboxylic acid, esters and the like. The amount of activating polar material added to the catalyst need not be large; in general it amounts to 0.2–2% by weight of the catalyst. The optimum quantitative ratio may readily be determined by a few preliminary experiments.

The transformation of polymerizable aliphatic olefins into high-molecular polymers in the presence of the above catalyst mixtures, and in the presence of small amounts of a polar substance, may be carried out particularly advantageously if an organic halogen compound is used as the polar substance.

The organic halogen compound may contain one or more halogen atoms in the molecule. Examples of suitable organic halogen compounds are methyl chloride, ethyl chloride, chloropropane, chloroacetic acid ethyl ester, benzyl chloride, ethyl bromide, ethylene dibromide, trichloroethylene, bromobenzene, chloroacetone, allyl chloride, and the like.

The polymerization reaction according to the present invention may be carried out as a batch process as well as a continuous process.

The reaction product may be worked up in a very simple fashion. The solvent components may be removed by simple squeezing, distillation, steam distillation, washing with alcohols, ethers, acetone, or the like known methods, while the inorganic components may be separated by treatment with water or aqueous solutions, for example aqueous acids, or also with alkalies. The yellow-to-brownish discoloration of the polymerized olefin obtained by the reaction is substantially removed thereby.

It is also possible to react the primarily formed metal-organic compound with other substances instead of with compounds containing hydroxyl groups. Such compounds are, for example, oxygen, ozone, hydrogen peroxide, halogens, such as chlorine or bromine, cyanide, thiocyanide and the like. Polar groups are thereby introduced as terminal groups into the polyolefins.

The nature and properties of the polymeric olefins depend upon the starting materials, the composition and quantity of the catalyst as well as on the reaction conditions. Liquid, viscous, resinous and solid products may be obtained thereby. A special advantage is that high-polymeric products are obtained in solid fibrous form.

The presence of substantial quantities of aluminum chloride during the production of the solid products has been found to be harmful, because substantial amounts of liquid polymerization products are formed thereby. Moreover, solid polymerizates produced under such conditions are much less uniform, which is manifested, for example, by the fact that they exhibit a rather undefined melting point.

The solid polymerization products have a relatively high melting point. Sometimes they exhibit a definite fibrous texture, even in their unpurified form. They are obtained in the form of felted fibers, and sometimes they resemble asbestos in appearance. They may, if desired, be further purified by reprecipitation from solvents.

The solid polymerized olefins may be used in the production of foils, coverings, fibers and threads, as insulating and packaging material, for the production of containers, tubes, plates, shaped articles, plastic coating on metals, etc. Liquid components of the polymerization products may be used as lubricants and oil additives.

The following examples will further illustrate the present invention and enable others skilled in the art to understand the present invention more completely. It will be understood, however, that my invention is not limited to the particular examples given below.

*Example I*

360 gm. of a petroleum hydrocarbon fraction having a boiling point of 110–140° C. were placed into an autoclave having a net volume of 1.7 liters and provided with an iron lining and a stainless steel stirring device. Thereafter, 6 gm. of aluminum carbide and 6 cc. of titanium tetrachloride were added. The autoclave was then closed and the air contained therein was removed by flushing with nitrogen. Subsequently, commercial grade ethylene was forced into the autoclave from a steel cylinder until the pressure in the autoclave reached 61 atmospheres' gauge. The pressure dropped to about 35 atmospheres' gauge, whereupon more ethylene was introduced until the pressure again reached 62 atmospheres' gauge. The pressure again dropped to 49 atmospheres' gauge and was once more raised to 62 atmospheres' gauge by introducing additional ethylene. The temperature of the contents was raised to 150° C. within a period of 1½ hours, and then maintained at 150–156° C. for 3 hours. The maximum internal pressure developed thereby was 118 atmospheres' gauge at 148° C. After allowing the contents to cool ot 34° C., the pressure dropped to 42 atmospheres' gauge. Thereafter, the brown contents of the autoclave, which weighed 537 gm. and turned white upon contact with the air, were comminuted into a powder and stirred twice with 600 cc. portions of ethanol. The solid components were removed by suction filtration and dried. The yield was 183 gm. 20 gm. of this raw polyethylene were dissolved by boiling the same with trichloroethylene under reflux, the resulting solution was filtered and the polyethylene was reprecipitated from the filtrate by adding methyl alcohol thereto. The reprecipitated polyethylene was separated from the liquid phase by vacuum filtration and dried. It had a melting point of 125° C.

*Example II*

360 gm. of a petroleum hydrocarbon fraction having a boiling point of 110–140° C., 6 gm. of aluminum carbide and 6 cc. of titanium tetrachloride were placed into the autoclave mentioned in the preceding example. The autoclave was then flushed with nitrogen, and ethylene was introduced under pressure until the internal pressure reached 56 atmospheres' gauge. The pressure dropped to 33 atmospheres' gauge, whereupon more ethylene was introduced until the pressure again stood at 56 atmospheres' gauge. The contents of the autoclave were then heated to a temperature of 100–101° C. within a period of 2 hours, and maintained at that temperature for about 3 hours. The maximum internal pressure developed thereby was 72 atmospheres' gauge. After allowing the contents to cool to 32° C., the internal pressure dropped to 17 atmospheres' aguge. The cooled contents were solid throughout and weighed 485 gm. The raw product had an asbestos-like, fibrous texture. The raw product was again worked up by washing with methyl alcohol and drying, whereby 73 gm. raw polyethylene were obtained. The raw polyethylene was purified by reprecipitation from perchloroethylene. The white purified product had a melting point of 124–125° C.

The above procedure was repeated, except that ethylene was reintroduced a second time into the autoclave until the internal pressure reached 60 atmospheres' gauge. In the case a maximum pressure of 97 atmospheres' gauge was reached at 102° C., while the terminal pressure at 28° C. was 47 atmospheres' gauge. 91 gm. raw polyethylene were obtained.

*Example III*

180 gm. of a petroleum hydrocarbon fraction having a boiling point of 110–140° C. were placed into an autoclave having a net volume of 1 liter, provided with an iron lining and a stainless steel stirring device. Thereafter, 6 gm. of aluminum in the form of aluminum shavings and 6 cc. of titanium tetrachloride were added thereto. The autoclave was closed and the air therein was displaced by flushing with nitrogen. Subsequently, commercial grade ethylene was introduced into the autoclave under pressure from a steel cylinder until the pressure in the autoclave reached 50 atmospheres' gauge. A few minutes later the pressure had dropped to 36 atmospheres' gauge, while the temperature rose from 30° C. to 34° C. Additional ethylene was introduced until the pressure again reached 50 atmospheres' gauge. Thereafter, the autoclave was heated so that the temperature rose to 152° C. within a period of one hour. At 141° C. the internal pressure reached a maximum value of 89 atmospheres' gauge and then dropped to 51 atmospheres' gauge at 151° C. The terminal pressure at 32° C. was 24 atmospheres' gauge. After allowing the autoclave to cool completely, the raw reaction product, which was partly solid and partly liquid, was admixed with methyl alcohol and the mixture was stirred for a short time. Thereafter, the solid components were separated by vacuum filtration and dried at 80° C. The dried product (22 gm.) was dissolved in hot perchloroethylene (500 cc.), the solution was filtered while hot, and the polyethylene was reprecipitated from the filtrate with methanol. The precipitated polyethylene was separated by vacuum filtration and dried. It had a melting point of 124° C.

*Example IV*

360 gm. of a petroleum hydrocarbon fraction having a boiling point of 110–140° C. were placed into an autoclave having a net volume of 1.7 liters, and 1 gm. of aluminum amalgam, 1 gm. of freshly prepared aluminum chloride and 6 cc. of titanium tetrachloride were added thereto. After flushing the autoclave with nitrogen, ethylene was introduced until the internal pressure reached 52 atmospheres' gauge. The pressure first dropped to 33 atmospheres' gauge, whereupon it was raised to 65 atmospheres' gauge by introducing additional ethylene. Thereafter it dropped again to 48 atmospheres' gauge and was raised to 60 atmospheres' gauge with more ethylene. The temperature of the contents rose from 24° C. to 32° C. The autoclave was then heated to 155° C.

within a period of 2 hours, whereby a maximum internal pressure of 140 atmospheres' gauge developed. The contents of the autoclave were then held at a temperature of 155–167° C. for four hours, during which period the pressure dropped to 99 atmospheres' gauge at 157° C. The terminal pressure upon cooling was 41 atmospheres' gauge at 31° C. The contents were allowed to cool completely and the raw polymerization product was worked up with methanol, as previously described. 62 gm. raw polyethylene were obtained which, upon purification in accordance with the procedure described in the preceding examples, had a melting point of 125° C. 48 gm. of a brownish-black oily residue were isolated from the solvent.

*Example V*

600 CC. of a petroleum hydrocarbon fraction having a boiling point of 110 to 140° C., 12 gm. of aluminum carbide and 45 gm. of titanium tetrabromide were placed into a stirrer autoclave having a capacity of 2 liters. Thereafter, the air in the autoclave was displaced with nitrogen and 60 atmospheres' ethylene were introduced under pressure. The autoclave was then heated within a period of 1½ hours to 130° C. Thereafter, the temperature was slowly increased to 170° C. in the course of 5 additional hours. The maximum pressure at 170° C. was 105 atmospheres. After cooling, the pressure was 42 atmospheres at 220° C.

The major contents of the autoclave were liquid. The solid substance present in the liquid was separated on a vacuum filter and the filter cake was boiled with methanolic hydrochloric acid. In this manner 13 gm. of a grayish-white solid polyethylene were obtained. A sample of this substance was dissolved in perchloroethylene and reprecipitated with methanol in order to determine its melting point. The melting point was 126° C. 14 gm. of an oily product having a higher boiling point were separated from the liquid mixture by distilling off the solvent.

While I have illustrated my invention with the aid of certain specific embodiments, it will be apparent to those skilled in the art that the present invention is not limited to these embodiments, and that various changes and modifications may be made without departing from the spirit of the invention or the scope of the appended claims.

I claim:

1. The method of polymerizing lower alkenes which comprises heating said alkenes in an inert atmosphere to a temperature upward of 100° C. at a pressure of at least 20 atmospheres' gauge in the presence of a catalyst mixture consisting of (1) about one part by weight of titanium tetrahalide and (2) about 0.5 to about 3 parts by weight of aluminum carbide.

2. The method of polymerizing alkenes according to claim 1, wherein the polymerization is carried out in the presence of an inert liquid hydrocarbon solvent.

3. The method of polymerizing ethylene into predominately solid polyethylene, which comprises heating ethylene in an inert atmosphere upward of 100° C. at a pressure of at least 20 atmospheres' gauge in the presence of a catalyst mixture consisting of (1) about one part by weight of titanium tetrahalide and (2) about 0.5 to about 3 parts by weight of aluminum carbide.

4. The method of polymerizing ethylene into predominately solid polyethylene, which comprises heating ethylene to a temperature between 100° C. and 185° C. at a pressure of at least 20 atmospheres' gauge in the presence of a catalyst mixture consisting of (1) about one part by weight of titanium tetrachloride and (2) about 0.5 to about 3 parts by weight of aluminum carbide.

5. The method of polymerizing ethylene into polyethylene in accordance with claim 4, wherein the polymerization is carried out in the presence of an inert liquid hydrocarbon solvent.

References Cited in the file of this patent

UNITED STATES PATENTS

| | | |
|---|---|---|
| 2,822,357 | Brebner et al. | Feb. 4, 1958 |
| 2,868,771 | Ray et al. | Jan. 13, 1959 |
| 2,879,263 | Anderson et al. | Mar. 24, 1959 |
| 2,899,418 | Reynolds et al. | Aug. 11, 1959 |
| 2,935,497 | Stuart | May 3, 1960 |

OTHER REFERENCES

Mellor: Comprehensive Treatise on Inorganic and Theoretical Chemistry, volume V, Longmans, Green & Co., London (1924), page 872.